July 24, 1962 G. M. PFUNDT 3,045,475

CHARGING AND PRESSURE TESTING CLAMP

Filed Feb. 26, 1959

INVENTOR.
GEORGE M. PFUNDT
BY
Howard E. Thompson
ATTORNEY

United States Patent Office 3,045,475
Patented July 24, 1962

3,045,475
CHARGING AND PRESSURE TESTING CLAMP
George M. Pfundt, Bustleton Pike, Churchville, Pa.
Filed Feb. 26, 1959, Ser. No. 795,761
2 Claims. (Cl. 73—49.8)

This invention relates to clamps for use in connection with cables and the like for pressure injecting gas or air into the casing of the cable and for taking pressure readings at various points along the cable. More particularly, the invention deals with a plier-type clamp device, wherein one jaw includes a saddle for location of the cable therein and the companion jaw includes a gripper head, having an apertured yieldable gasket or gripper element for pressure engagement with the surface of a cable or the like in the environment of a hole formed therein.

Still more particularly, the invention deals with a device of the character described, having means for definitely alining and/or locating the gripper head with respect to an aperture formed in the cable casing.

The novel features of the invention will be best understood from the following description, when taken together with the accompanying drawing, in which certain embodiments of the invention are disclosed and, in which, the separate parts are designated by suitable reference characters in each of the views and, in which.

My improved clamp device is used in conjunction with what are known as pressure testing kits, utilized in testing the pressure within a tubular body of any type or kind and, particularly, cables for the purpose of locating flaws or leaks that may prevail in the tubular casing.

Figure 1:
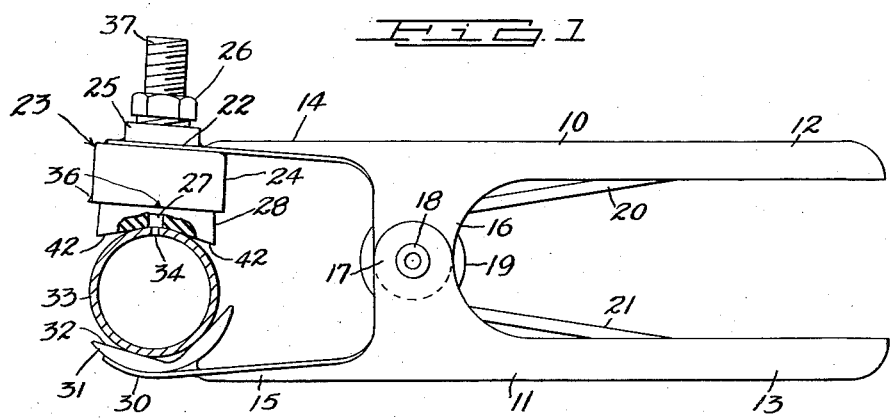
FIG. 1 is a side view of a clamp made according to my invention, diagrammatically illustrating its arrangement upon a cable casing, with part of the construction broken away and in section.
Figure 2:
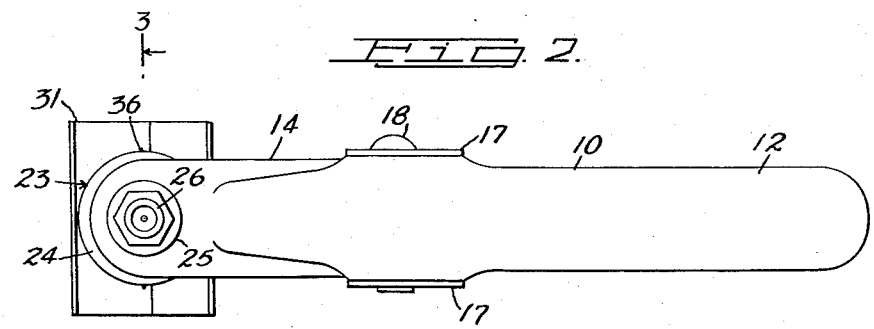
FIG. 2 is a plan view of the structure, as shown in FIG. 1, and omitting the cable casing shown in FIG. 1.
Figure 3:
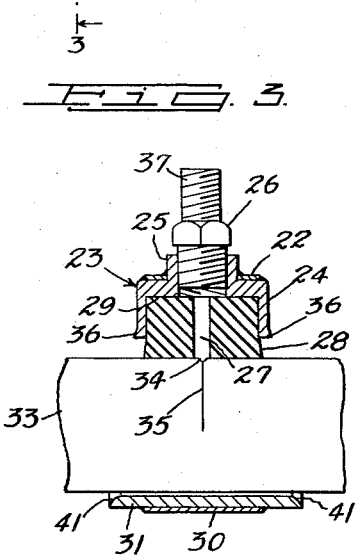
FIG. 3 is a section on the line 3—3 of FIG. 2 showing the clamp arranged upon a cable casing.

In FIGS. 1 to 3, inclusive, I have shown a plier-type clamp and, for purposes of description, reference character 10 can be said to represent the upper member of the clamp and 11 the lower member thereof, each member being preferably stamped from sheet metal and fashioned to form two long handle members 12 and 13, respectively, generally of channel cross-sectional form. The other ends of the members define jaws 14, 15, respectively. Intermediate the jaws, the members 10 and 11 have, at sides thereof extending bearing portions 16 and 17, respectively, which overlap and are secured together by a riveted pivot pin 18. Arranged upon the pin, intermediate the side bearings 16 and 17, is a heavy coil spring 19, the ends 20, 21 of which extend onto inner surfaces of the handle members 12 and 13 and are tensioned to normally urge the jaws 14, 15 toward each other.

The jaw 14 terminates at its free end in a relatively flat apertured portion 22, to which is welded or otherwise secured a gripper head 23, comprising a casing 24 arranged upon the inner surface of the jaw 22, the casing in the construction shown being in the form of a circular cup. The cup includes an upwardly extending reduced internally threaded sleeve portion 25, which protrudes above the outer surface of the plate 22, as clearly noted in FIGS. 1 and 3 of the drawing.

Mounted in the sleeve 25 is a more or less standard valve nozzle 26, having the usual check valve facilitating the pressure injection of air or gas through the valve for discharge into the casing 24 or into an aperture 27 in a yieldable gripper or gasket 28 composed or rubber or similar yieldable material. The gasket 28 is seated snugly in the casing 24 and in operation of the clamp, the upper surface of the gasket 28 will have a pressure seat on the surface 29 of the upper wall of the casing 24.

The other jaw 15 terminates, at its free end, in a rounded plate portion 30, to the inner surface of which is welded or otherwise fixed a saddle 31, having an inner or exposed surface 32 suitable for engagement with and location of a tubular casing 33 thereon. In the construction shown, the surface 32 is generally V-shaped in form, so as to adapt the saddle for engagement with members 33 of varying diameters. It will also be noted that the saddle ends extend beyond sides of the jaw 15, as clearly noted in FIG. 2 of the drawing.

The member 33 can comprise the casing of a cable or any type of elongated tubular member and, for this reason, no attempt has been shown to specifically illustrate the interior of the casing or tubular member 33.

In the use of the clamp, an aperture 34 is formed in the wall of the member 33 and the clamp is then coupled with the member 33, so as to register the aperture 27 with the aperture 34. This location can be simplified by marking the outer surface of the tubular casing or member 33 with cross-lines, intersections of which would locate the aperture 34. In FIG. 3 of the drawing, I have diagrammatically illustrated at 35 one of the cross-lines referred to, in other words, the line extending circumferentially of the member 33. The other line would not appear on FIG. 3. These lines will extend sufficiently to project beyond the head 23, so that protruding marker elements 36 on the lower end of the casing can be brought into registering alinement with the markings 35, so as to definitely locate the aperture 27 over the aperture 34. It will be apparent that the valve 26 has an outer threaded end, as at 37, to facilitate coupling of tubings of testing kits or the like therewith, or pressure charging tubings for injection of the gas or air under pressure into the casing of the member 33.

Figure 4:
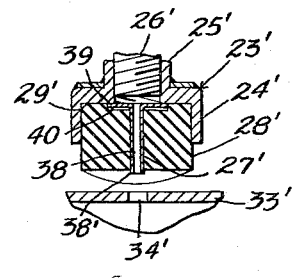
FIG. 4 is a partial view of a modified form of gripper head which I employ, shown in spaced relation to a sectioned portion of a cable casing, preparatory to engagement of the head with said casing.

In FIG. 4 of the drawing, I have shown a slight modification, wherein 23' represents a head, generally similar to the head 23, 24' the casing which does not include the marker elements 36 and, here, the yieldable gripper or gasket 28' is modified to the end of having an alinement tube 38 arranged in the aperture 27' thereof, the tube having, at its upper end, a circular flange 39 freely disposed in an enlarged portion 40 of the aperture 27'. The flange 39 is sufficiently large to seat upon the surface 29' of the casing beyond the threaded bore of the sleeve 25'.

With this construction, it will be apparent that the upper portions of the gasket 28', which surround the flange 39', have a free bearing upon the surface 29' to effect a positive seal and the clearnce provided at 40 facilitates the compression of the gasket when the head is brought into engagement with the tubular casing illustrated, in part, at 33' in FIG. 4. The tubular casing or member 33' is shown spaced from the head in order to clearly illustrate the ability of locating the protruding end 38' of the tube 38 and its ability to locate the aperture 34' in the member 33' in proper positioning of the clamp upon the member 33', thus dispensing with the markings, as at 35 in FIG. 3 of the drawing. At 26' in FIG. 4 is illustrated part of the valve, similar to the valve 26.

Considering FIG. 3 of the drawing, it will be noted that the side edge portions of the saddle 31 are preferably rounded, as seen at 41, to prevent the saddle from digging into the casing 30, particularly when this casing may be composed of relatively soft material. It will also appear, from a consideration of FIG. 1 of the drawing, that the exposed surface of the gasket 28 has outwardly and downwardly flared sides, as at 42, arranged in alinement with the jaw 14, so as to accentuate the gripping or sealing action of the gasket directly around the aperture 34, bearing in mind that, in some instances, the outer surface of the member 33 may be irregular and it is important to effect the pressure seal of the gasket directly in the environment of the aperture 34.

Having fully described my invention, what I claim as new and desire to secure by Letters Patent is:

1. A spring clamp device of the character described comprising a pair of members having handle ends and jaw ends, means pivotally coupling said members intermediate said ends, said jaw ends adjacent and beyond the pivot means, in their entirety, being widely spaced, spring means for normally urging the jaw ends toward each other, one jaw end supporting on its inner surface an elongated saddle directly fixed to said jaw end, the other jaw end having an aperture, a gripper head comprising a cup-shaped casing and an integral internally threaded sleeve, said sleeve being arranged in the aperture of said jaw with said casing fixed to the inner surface thereof, a yieldable gasket mounted in said casing and projecting therefrom, the gasket having an aperture opening through upper and lower surfaces thereof, the lower surface of the gasket having downwardly flared sides, a valve coupled with said threaded sleeve and in communication with the aperture of said gasket, said head being adapted to support a tubular member in pressure engagement with the saddle of the opposed jaw with the aperture of said gasket in registering alinement with an aperture in the wall of said tubular member, and the elongated saddle extending well beyond side surfaces of said gripper head.

2. A spring clamp device of the character described comprising a pair of members having handle ends and jaw ends, means pivotally coupling said members intermediate said ends, said jaw ends adjacent and beyond the pivot means, in their entirety, being widely spaced, spring means for normally urging the jaw ends toward each other, one jaw end supporting on its inner surface an elongated saddle directly fixed to said jaw end, the other jaw end having an aperture, a gripper head comprising a cup-shaped casing and an integral internally threaded sleeve, said sleeve being arranged in the aperture of said jaw with said casing fixed to the inner surface thereof, a yieldable gasket mounted in said casing and projecting therefrom, the gasket having an aperture opening through upper and lower surfaces thereof, the lower surface of the gasket having downwardly flared sides, a valve coupled with said threaded sleeve and in communication with the aperture of said gasket, said head being adapted to support a tubular member in pressure engagement with the saddle of the opposed jaw with the aperture of said gasket in registering alinement with an aperture in the wall of said tubular member, the elongated saddle extending well beyond side surfaces of said gripper head, means projecting beyond the surface of said gasket for alining the head with the aperture in said tubular member, and the exposed surface of said saddle being generally V-shaped in form.

References Cited in the file of this patent

UNITED STATES PATENTS

| 983,962 | Werner | Feb. 14, 1911 |
| 1,671,935 | Price | May 29, 1928 |
| 2,001,707 | Clemens | May 21, 1935 |
| 2,398,306 | Hermanson | Apr. 9, 1946 |

FOREIGN PATENTS

| 16,794 | Great Britain | July 31, 1903 |